(12) United States Patent
Okada et al.

(10) Patent No.: US 6,190,798 B1
(45) Date of Patent: Feb. 20, 2001

(54) SEALED BATTERY AND METHOD OF MANUFACTURING THE SAME

(75) Inventors: Naotada Okada; Masahiro Kato, both of Yokohama; Katsuhisa Homma, Yokosuka; Kitio Akiyama, Fujioka; Ryuichi Togawa, Yokohama, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/222,430

(22) Filed: Dec. 29, 1998

(30) Foreign Application Priority Data

Jan. 9, 1998 (JP) .................................................. 10-003095
Mar. 19, 1998 (JP) .................................................. 10-070277

(51) Int. Cl.[7] .................................................. H01M 2/00
(52) U.S. Cl. .......................................... 429/163; 429/182
(58) Field of Search ................................. 429/50, 73, 94, 429/129, 133, 162, 163, 175, 178–182, 231.95; 29/623.1

(56) References Cited

U.S. PATENT DOCUMENTS

| | | | |
|---|---|---|---|
| 4,544,078 | * | 10/1985 | Arenas et al. . |
| 5,173,375 | * | 12/1992 | Cretzmeyer et al. . |
| 5,486,215 | * | 1/1996 | Kelm et al. . |
| 5,569,553 | * | 10/1996 | Smekso et al. . |
| 5,585,207 | * | 12/1996 | Wakabe et al. . |
| 5,783,326 | * | 7/1998 | Hasebe . |
| 5,834,133 | * | 11/1998 | Narukawa et al. . |
| 5,879,416 | * | 3/1999 | Nakamura et al. . |
| 6,045,944 | * | 4/2000 | Okada et al. . |

FOREIGN PATENT DOCUMENTS

| | | |
|---|---|---|
| 9-35699 | 2/1997 | (JP) . |
| 9-245837 | 9/1997 | (JP) . |

* cited by examiner

*Primary Examiner*—Carol Chaney
*Assistant Examiner*—Susy Tsang
(74) *Attorney, Agent, or Firm*—Oblon, Spivak, McClelland, Maier & Neustadt, P.C.

(57) ABSTRACT

An outer case has an opening portion and a power generation element is held in the outer case and has a positive electrode and negative electrode with a separator interposed. A cover member is joined to the opening portion and the cover member is welded to the outer case with a laser beam. An injection port is formed in the cover member. After an electrolyte has been injected via the injection port into the outer case, a sealing member is pressed in a hermetical way into the injection port and then blocked by a sealing cover welded to the cover member using the laser beam. Furthermore, a pressing member is provided between the power generation element and the inner surface of the cover member wherein one end of the pressing member is receded a predetermined dimension from the injection port.

11 Claims, 3 Drawing Sheets

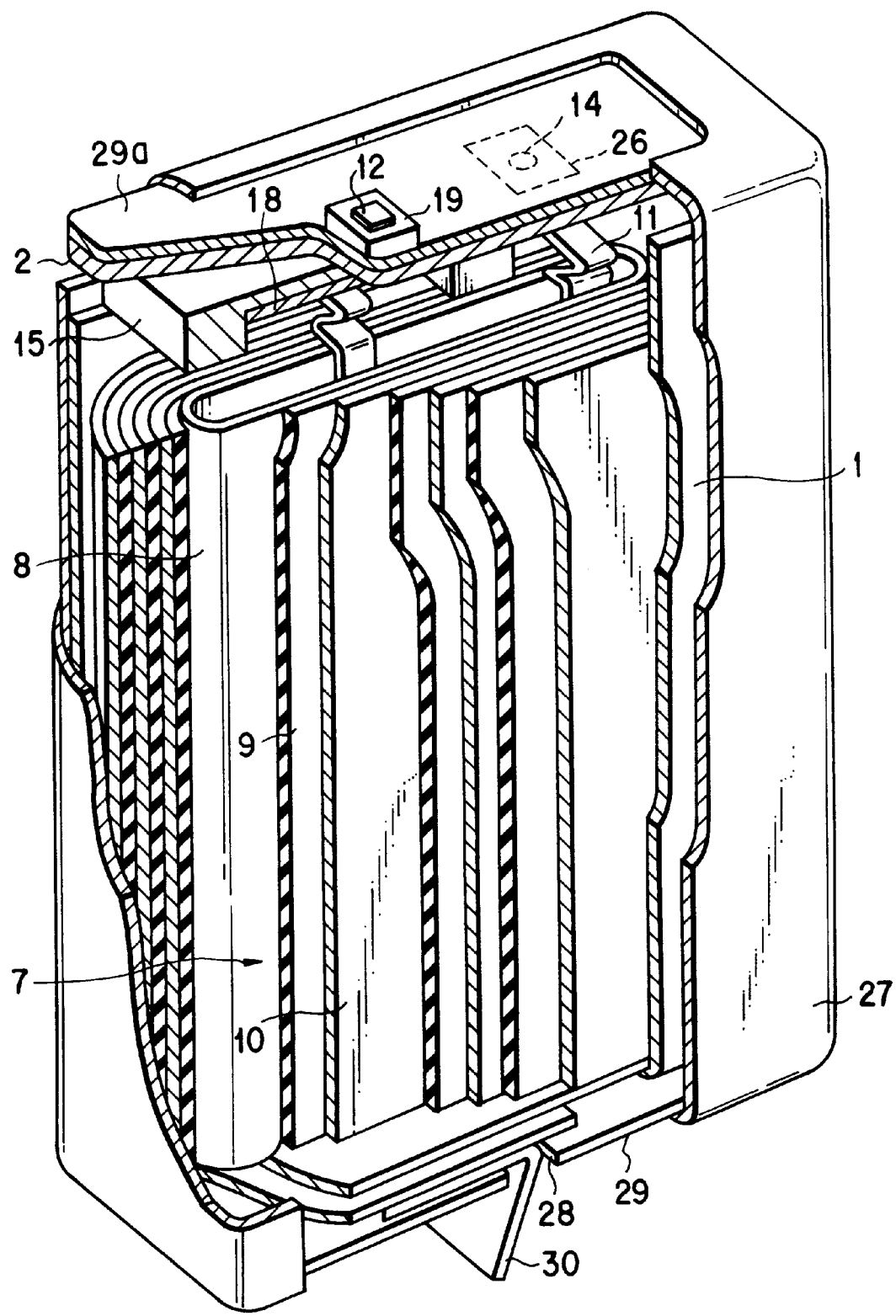
F I G. 1

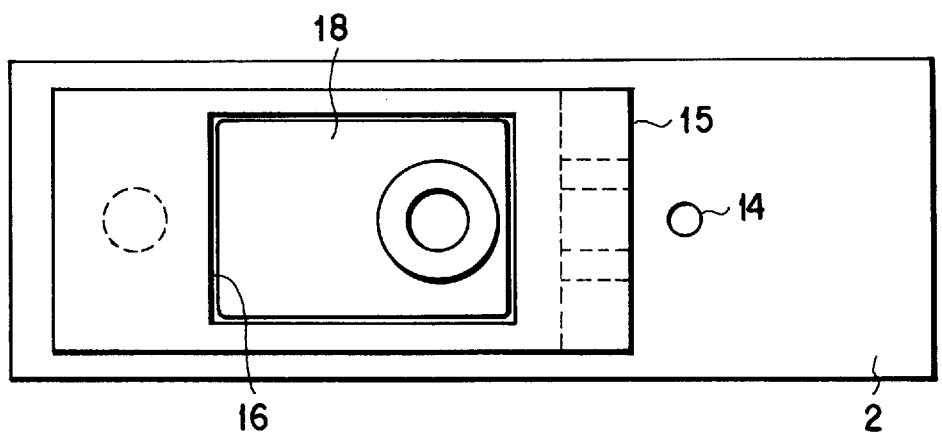
F I G. 4
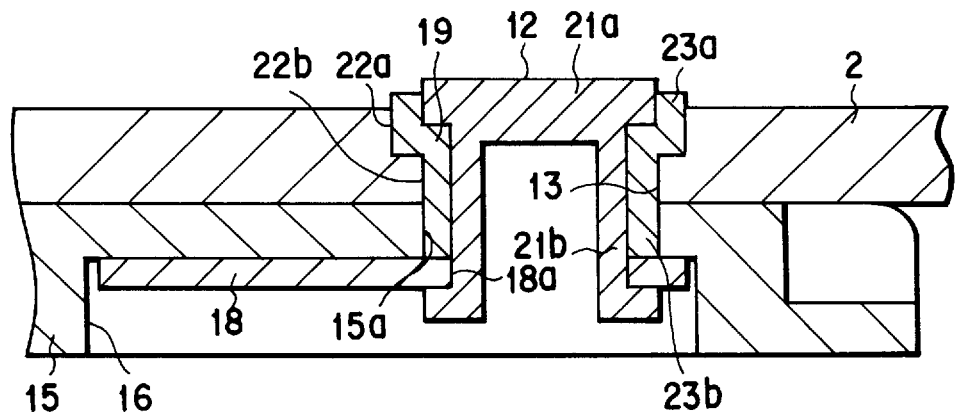
F I G. 5
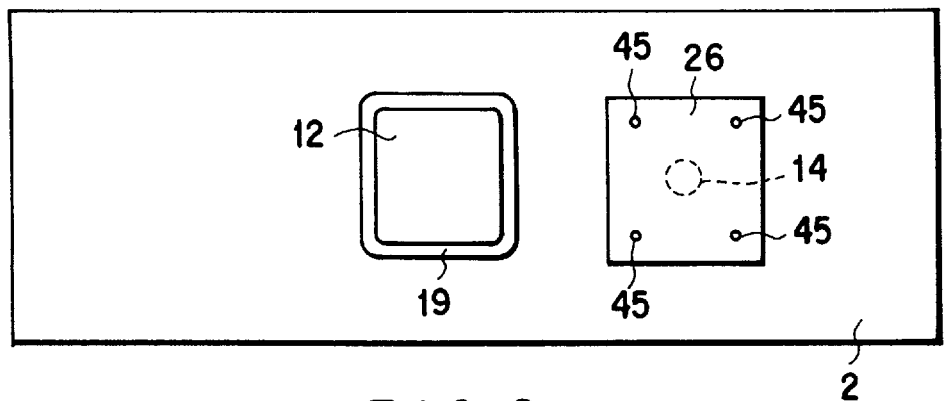
F I G. 6

SEALED BATTERY AND METHOD OF MANUFACTURING THE SAME

BACKGROUND OF THE INVENTION

1. Field of the Invention

The present invention relates to a sealed battery manufactured by coupling a cover member to an opening portion of a prismatic outer case and welding the cover member to the opening portion of the prismatic outer case and a method for manufacturing the same.

2. Description of the Background

Recently, because of an increasing demand for portable OA devices and communication devices there is a greater demand for a prismatic sealed battery as their power supplies. In those nickel metal hydride rechargeable batteries and lithium ion rechargeable batteries, a prismatic sealed batteries in particular can make the devices smaller in size and be mounted in the above-mentioned devices with high volume efficiency.

In general, the prismatic sealed battery has an outer case with an opening portion provided therein. In the battery, a cover member is coupled to the opening portion and a coupling portion between these members is hermetically welded by a laser beam.

The outer case has a power generating element with positive and negative polarities formed with a separator set therebetween and an electrolyte held therein. An electrode terminal is provided on the cover member to be electrically connected to the power generating element.

The cover member has an injection port for injecting an electrolyte into the outer case after the cover member has been welded to the outer case. The injection port is closed by a sealing cover after the electrolyte has been injected into the outer case. The sealing cover is welded there by a laser beam.

In the sealed battery thus constructed, when the injection hole in the cover member is closed with the cover and they are welded by a laser beam, the injected electrolyte in the outer case is evaporated by heat applied to the outer case, resulting in leaks out of the outer case. For this reason, the welded portion at the cover member and sealing cover is affected by the evaporated electrolyte, sometimes leading to the failure in forming a hermetical weld between the sealing cover and the cover member. In this case, the leaking electrolyte corrodes the cover member, etc., and mars the outer appearance, etc., of the battery.

Between the power generating element and the inner surface of the cover member a pressing member is provided for preventing the power generating element from being displaced in the outer case. Since the injection port is provided in the cover member, a hole is provided in the pressing member at a place corresponding to the injection port to allow the electrolyte to be injected from the injection port into the outer case or a cutout is provided in the pressing member along the shape of the port.

Although the hole or cut-out is provided in the pressing member, if the electrolyte is injected from the injection port into the outer case, there is sometimes the case where a portion of the electrolyte flows along the inner surface of the cover member and is accumulated at the injection port at a place between the cover member and the pressing member.

If, in such a state, the injection port is blocked by the sealing cover welded by a laser beam, the electrolyte is evaporated at an area between the cover member and the pressing member due to the ingress of heat. Due to this cause, there is sometimes the case where a hermetical weld cannot be performed at the welding section, leading to corrosion of the outer surface of the cover member followed by marring an outer appearance of the battery.

SUMMARY OF THE INVENTION

It is accordingly the object of the present invention to provide a sealed battery with an injection port in a cover member being blocked with a sealing cover and designed to prevent an electrolyte which is injected into an outer case from leaking out of the outer case and a method for manufacturing the same.

In accordance with the present embodiment, a prismatic sealed battery is provided comprising:

an outer case metal having an opening portion;

a power generation element held in the outer case and having positive and negative electrodes between which a separator is sandwiched;

a cover member of metal joined by welding to the opening portion;

an electrode terminal electrically connected to the power generation element;

an injection port formed in the cover member or outer case, through which an electrolyte is injected into the outer case;

a sealing member inserted into the injection port to seal the same hermetically; and a sealing cover joined by laser welding to at least of one the cover member and the outer case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view, partly in cross-section, showing a prismatic sealed battery according to one embodiment of the present invention;

FIG. 4 is a plan view looking at the cover case from an inner surface side;

FIG. 5 is an enlarged cross-sectional view showing a portion provided at a negative terminal of the cover member; and FIG. 6 is a plan view showing a cover member of a prismatic sealed battery according to another embodiment of the present invention.

DETAILED DESCRIPTION OF THE PREFERRED EMBODIMENTS

Figure 2:
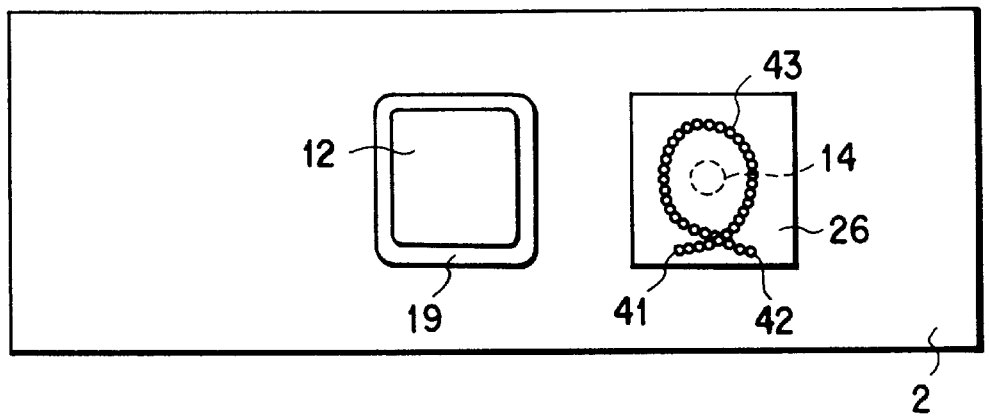
FIG. 2 is a plan view showing a cover member of the prismatic sealed battery.

The embodiments of the present invention will be explained below with reference to the accompanying drawing.

FIGS. 1 to 5 show an arrangement of a prismatic sealed battery according to one embodiment of the present invention. The prismatic sealed battery of the present invention has a structure as shown in FIG. 1. That is, the prismatic sealed battery has an outer metal case 1 of a prismatic configuration. The outer metal case has an opening portion at an upper end surface and a rectangular bottom. The outer case 1 also serves as a positive polarity terminal.

An electrode member 7 serving as a power generating element is held in the outer case 1. The electrode member 7, being a lithium ion secondary battery, comprises a negative electrode 8 of a copper thin film on both sides of which an active substance containing a carbonaceous material is coated, a separator of porous polypropylene sheet, and a positive electrode 10 of an aluminum thin film on both sides of which an active substance containing lithium nickel oxide, lithium cobalt oxide, etc., is coated. These are spirally wound in a manner to have the positive electrode 10 situated on the outermost side and are shaped with an oval cross-section.

The outer case 1 and electrode member 7 are electrically connected together through the cover member 2. That is, a positive electrode lead 11 is extended from the positive electrode 10 and electrically connected to the cover member 2.

Figure 3:
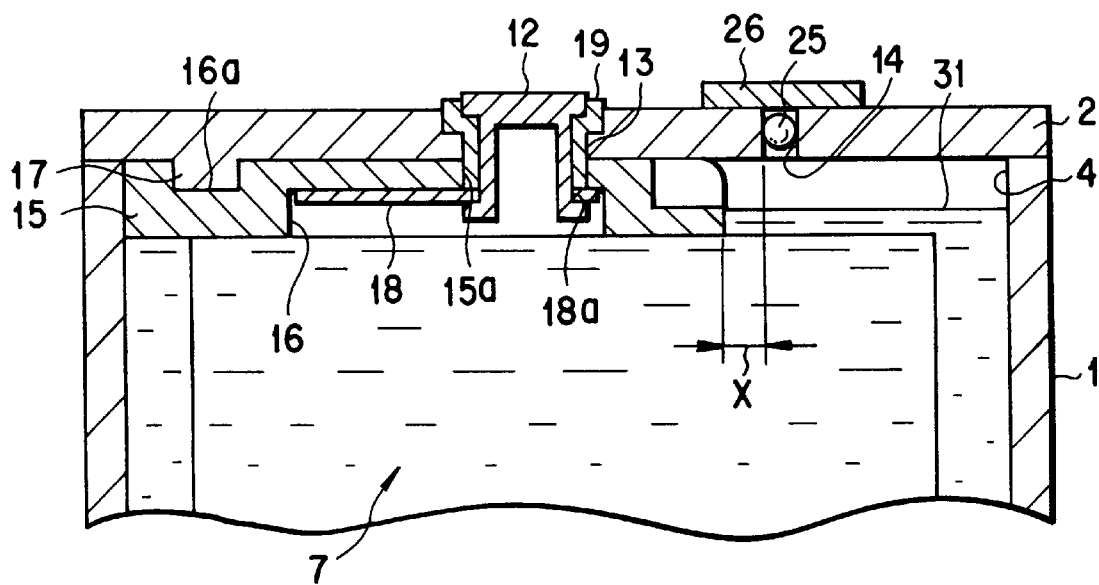
FIG. 3 is a vertical cross-sectional view showing a cover member and part of an outer case of the sealed battery.

A mount hole 13 for the negative terminal 12 is provided in the cover member 2 at a near-center area as shown in FIG. 3. An injection port 14 for an electrolyte is provided in a position a predetermined distance from the mount hole 13.

The cover member 2 is coupled to an opening portion 4 of the outer cover 1 and these are welded by a laser beam.

A pressing member 15 is located between the cover member 2 and the electrode member 7 in the outer case 1 and made of an electrically insulating synthetic resin such as polypropylene. The pressing member 15 has one side surface joined to the inner surface of the cover member 2 and is equipped at the other side surface with a rectangular recess 16.

A fitting recess 16a is provided at one end portion of the one side surface of the pressing member 15 and a projection 17 is provided at the one end portion of the cover member 2 and fitted into the fitting recess 16a. The pressing member 15 is positioned relative to the cover member 2 by fitting the projection 17 into the fitting recess 16a.

One end of the so positioned pressing member 15 on the injection port 14 side has its length so set as to recede a predetermined position from the injection port 14 as indicated by X in FIG. 3. It is desirable that the receding length dimension X be above 0.3 mm.

A metal electrode terminal connection plate 18 is joined to the recess 16 of the pressing member 15. Circular through-holes 15a and 18a are provided, respectively, in the pressing member 15 and electrode terminal connection plate 18 to allow a communication with the mount hole 13.

As shown in FIG. 5, a negative terminal 12 is provided in the mount hole 13 of the cover member 2 with a cylindrical insulating material 19 of glass or resin therebetween. These are hermetically processed and fixed to the cover member 2. The negative terminal 12 comprises a rectangular, for example, a square-shaped head section 21a and a cylindrical leg section 21b integral with the head section 21a.

The mount hole 13 comprises a square-shaped prismatic hole 22a corresponding to the configuration of the head section 21a of the negative terminal 12 and a circular-cylindrical section 22b corresponding to the configuration of the leg section 21b. The insulating material 19 comprises a square-shaped prismatic section 23a conforming to the prismatic section 22a of the mount hole 13 and a circular cylindrical section 23b conforming to the circular cylindrical section 22b.

The negative electrode terminal 12 is inserted into the mount hole 13 with the insulating material 15 set therebetween and is so positioned as to have its head section 21a engage with the prismatic section 13 with the prismatic cylindrical section 23a of the insulating material 15 set therebetween. By doing so, the negative electrode terminal 12 is prevented from being rotated in a circumferential direction.

The negative electrode terminal 12, being prevented from being rotated in the mount hole 13, never impairs a hermetic state achieved by performing hermetic processing on the insulating material 19 and negative polarity terminal 12 in the mount hole 13.

The lower end portion of the prismatic section 23b of the insulating material 19 is inserted into the through-hole 15a of the pressing member 15 and abuts against the top surface of the electrode terminal connection plate 18. The lower end section of the leg section 21b of the negative electrode terminal 21 extends from the prismatic section 15a and through-hole 18a of the electrode terminal connection plate 18. And the lower end portion of the leg section 21b of the negative electrode terminal 21 is caulked outwardly in a diameter direction. By doing so, the pressing member 15 is held in a way integral with the lower surface of the cover member 2.

A spherical sealing member 25 is press-sealed in a hermetic manner into the injection port 14 as shown in FIG. 3. An electrolyte is injected into the outer case 1 via the injection port 14. Then the sealing member 25 is pressed into the injection port 14.

The sealing member 25 has a tensile modulus of elasticity below 400 kgf/mm$^2$ and a hardness of preferably 60° to 90° in International hardness unit (measured under Japanese Industrial Standard K 6301) and, in the present embodiment, a hermetic seal can be achieved using the elastic body ethylenepropyrene rubber, silicone resin, fluorine resin, etc. In the case where the internal diameter dimension of the injection port 14 is 1.2 mm, the external diameter dimension of the sealing member 25 is 1.3 mm and the sealing member 25 is pressed into the injection port 14. Since the hermetic seal is maintained as mentioned above, it is possible to, even during a welding time, prevent a failure of a welding process resulting from the vaporization of the electrolyte and flowing-out of its vapor from the injection port 14.

In this connection it is to be noted that the sealing member 25 may take not only a spherical form but also cylindrical or conical forms.

After the electrolyte 31 has been filled into the outer case 1, the injection port 14 is blocked by the sealing cover 26 of metal plate welded to the cover member 2 in a hermetic way. A material for the sealing member 26 is aluminum or aluminum alloy. The aluminum can be pure aluminum (99.3% purity). It is Japanese Industrial Standard alloy No. AlN 30. And the aluminum alloy is containing magnesium below 0.05 weight percent and copper below 0.2 weight percent.

Instead of forming the injection port 14 in the cover member 2, it may be possible to, though not shown, form at least one of the cover member 2 and the outer case 1. The injection port 14 in a bottom of the outer case 1 for example and, after injecting an electrolyte 31 (shown in FIG. 3)

through the injection port 14, block the injection port by a corresponding sealing cover 26.

For the case of a lithium ion secondary battery, the electrolyte 31 is an organic solvent, such as ethylene carbonate and propylene carbonate, containing an solute, such as lithium perchlorate, lithium borofluoride, lithium hexafluoride, phorphor lithium hexafluoride, etc.

As shown in FIG. 1, the whole outer surface of the cover member 2 containing the sealing cover 26 is covered with an upper insulating sheet 29a. A lower insulating sheet 29 having a slit 28 is covered on an inner bottom surface of the outer case 1. A two-folded PTC (positive thermal coefficient) element 30 has one surface inserted between the bottom surface of the outer case 1 and the lower insulating sheet 29 and the other surface extending outside of the lower insulating sheet 29 through the slit 28.

An outer tube 27 is so arranged as to extend from the side surface of the outer case 1 onto the peripheral edges of the upper insulating sheet 29a and lower insulating sheet 29. The upper insulating sheet 29a and lower insulating sheet 29 are fixed to the outer case 1. This arrangement of the outer tube 27 allows said other surface of the outwardly extending PTC element 30 to be bent toward the bottom surface of the lower insulating sheet 29.

The cover member 2 is welded to the opening portion 3 of the outer case 1 with the use of a laser beam. A method for fixing the cover member 2 to the outer case 1 by a laser welding has an advantage of sealing the opening portion 3 of the outer case 1 with minimum decrease in volume efficiency.

An explanation will now be given about the process of manufacturing the sealed battery so arranged.

First, the power generating element (electrode member 1) is held in the outer case 1 and the cover member 2 is joined to the opening portion 3. The outer case 1 is made of an aluminum-series metal or aluminum containing, for example, Mg of below 0.05 weight percent and Cu of below 0.2 weight percent.

Using these materials, a crack at welded portion which is produced during solidification of aluminum is significantly suppressed. To put it in more detail, aluminum (Japanese Industrial Standard alloy No. AIN 30) under an AA Standard 3003, 1050, 1100 and 1200 or of a purity of 99.3% or above, etc., is preferable.

The outer case 1 is shaped, by a press working, such as a deep drawing and cold impact working, so as to have these materials formed to a predetermined thickness.

The cover member 2 is coupled to the opening portion 3 of the outer case 1. Then a coupling section (face to be welded) between the outer case 1 and the cover member 2 is irradiated with a laser beam (not shown) from a YAG laser. Scanning is done along a circumferential direction. By doing so, the coupled section is seam-welded to provide a continuous molten portion, so that the outer case 1 is sealed with the cover member 2.

As the material of the cover member 2, aluminum alloy and aluminum as in the case of the outer case 1 as set out above are used.

Using the YAG laser as the laser beam source ensures more efficient welding because the wavelength is shorter than that from a $CO_2$ laser and the reflectivity on the aluminum and its alloy is smaller than that by the $CO_2$ laser. The laser beam is focused onto the coupling section from a laser oscillator through an optical fiber and a lens (not shown even in this case).

Then a nonaquenous electrolyte 31 is injected from the injection port 14 in the cover member 2 into outer case 1, the nonaquenous solute electrolyte being obtained by dissolving the electrolyte of phosphor lithium hexafluoride with solvent of ethylene carbonate and methyethylcarbonate.

After the electrolyte 31 has been injected, the sealing member 25 is pressed into the injection port 14, thus sealing the injection port 14 in a hermetical manner. Then the injection port 14 is sealed with the sealing cover 26 welded to the cover member 2 with the laser beam. As a practical example, with the thickness of the cover member 2 set to be 1.0 mm and the internal diameter of the injection port 14 set to be 1.2 mm, the sealing plate 26 was formed by an aluminum plate of 0.2 mm in thickness and 5 mm square.

Under the conditions of an irradiated energy of 5.0 J/pulse, a pulse width of 5.0 ms, a repetition rate of 24 Hz and an overlap ratio of 75%, the laser beam was scanned around the injection port 14 along an elliptical closed loop welding locus 43 starting from a point 41 and ending to a point 42, provided that the starting point 41 and ending point 42 are situated outside the closed loop. By doing so, the sealing cover 26 was welded by seam-welding.

When the electrolyte 31 is injected from the injection port 14 into the outer case 1, since one end of the pressing member 15 is situated in a position reduced a predetermined dimension from the injection port 14, the electrolyte 31 injected from the injection port 14 is hardly stored in a volume between the cover member 2 and the pressing member 15. In addition, the injection port 14 is sealed by the sealing member 25 in a hermetical manner.

Even if the electrolyte 31 is vaporized due to the ingress of heat to the cover member 2 and sealing cover 26, it is possible to prevent the electrolyte 31 from leaking out of the outer case 1 by welding the sealing cover 26 to the cover member 2.

After the electrolyte 31 is injected from the injection port 14 into the outer case 1, the electrolyte 31 entering between the cover member 2 and the pressing member 15 vaporizes during welding the sealing cover 26 weld defects caused by the leaking of the vaporized electrolyte 31 out of the injection port 14.

Only if either end of the pressing member 15 is receded a predetermined dimension from the injection port 14 in order to prevent the leakage of the electrolyte 31 during welding, an adequate effect can be obtained. It is also possible to obtain an adequate advantage only by pressing the sealing member 25 into the injection port 14. If both of the structures are adopted, it is possible to strongly prevent the electrolyte 31 from leaking out of the outer case.

Although the sealing cover 26 is seam-welded to the cover member 2 and, by doing so, a hermetic seal is achieved between them, if the sealing member 25 is pressed into the injection port 14, it is possible to maintain the injection port 14 hermetic. In the embodiment shown in FIG. 6, the sealing cover 25 is welded to the cover member 2 by a plurality of spots 45.

If the sealing cover 26 is thus welded to the cover member 2, the upper insulating sheet 29a is arranged on the cover member 2 and lower insulating sheet 29 having the slit 28 is arranged on the outer surface of the bottom of the outer case 1 and a two-folded PCT element 30 is arranged relative to the lower insulating sheet 29. The whole structure including the outer case 1 is wrapped with an outer rube 27. By heat-shrinking the tube 27 the insulating sheet 29a is fixed to the cover member 2 and both of the lower insulating sheet 29 and PCT 30 are fixed to the bottom of the outer case 1, thus providing a prismatic sealed lithium ion secondary battery.

In the embodiment, the prismatic sealed battery means that the cross-sectional configuration taken by cutting the outer case 1 in a plane including the electrode member 7 is substantially rectangular. Needless to say, the present invention can be applied to not only the prismatic sealed battery but also other forms of sealed battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sealed battery, comprising:

an outer case of metal having an opening portion;

a power generation element held in the outer case and having positive and negative electrodes between which a separator is sandwiched;

a cover member of metal joined by welding to the opening portion;

an electrode terminal electrically connected to the power generation element;

an injection port formed in the cover member, through which an electrolyte is injected into the outer case;

a sealing member inserted into the injection port to seal the same hermetically; and a sealing cover joined by laser welding to the cover member or in order to block the injection port;

wherein a pressing member is provided between the power generation element and the inner surface of the cover member to hold the power generating element in place, and wherein one end of the pressing member is receded a predetermined dimension from the injection port.

2. The sealed battery of claim 1, wherein the sealing member is an elastic body.

3. The sealed battery of claim 1, wherein the sealing member is made of ethylene propylene rubber.

4. The sealed battery of claim 1, wherein the sealing member has a spherical configuration.

5. The sealed battery of claim 1, wherein the sealing cover and at least one of the cover member and outer case are made of aluminum or aluminum alloy containing magnesium in an amount of less than 0.05 wt. % and copper in an amount of less than 0.2 wt. %.

6. A sealed battery, comprising:

an outer case of metal having an opening portion;

a power generation element held in the outer case and having positive and negative electrodes between which a separator is sandwiched;

a cover member of metal having an injection port for injecting an electrolyte into an outer casing, the cover member being joined by welding to an opening portion of the outer case;

an electrode terminal electrically connected to the power generating element;

a pressing member provided between the power generating element in the outer case and an inner surface of the cover member and having one end so provided as to be located in a position a predetermined dimension receded from the injection port; and a sealing cover so set as to block injection port in the cover member, the sealing cover being welded by a laser beam to the cover member.

7. The sealed battery of claim 6, wherein the cover member and sealing cover are made of aluminum or aluminum alloy.

8. The sealed batter of claim 6, wherein the electrode terminal is provided at the cover member and the pressing member is held at and fixed to the cover member through the electrode terminal.

9. The sealed battery according to claim 6, further comprising means for positioning the pressing member relative to the cover member by fitting together the cover member and pressing member.

10. The sealed battery according to claim 6, wherein the electrode terminal is inserted into a mount hole in the cover member in a manner not to be withdrawable from the mount hole, the electrode terminal of a planar configuration at least provided in the mount hole so as to prevent the electrode terminal from being rotated in the mount hole.

11. The sealed battery according to claim 6, wherein the pressing member is made of polypropylene.

* * * * *